United States Patent [19]

Blais

[11] Patent Number: 5,348,613

[45] Date of Patent: Sep. 20, 1994

[54] PATCHING TOOL AND METHOD

[76] Inventor: Normand D. Blais, 26 Chestnut St., Johnston, R.I. 02919

[21] Appl. No.: 151,742

[22] Filed: Nov. 15, 1993

[51] Int. Cl.⁵ .................................................. B32B 31/00
[52] U.S. Cl. ..................................... 156/579; 156/94; 156/574; 156/576
[58] Field of Search ............... 156/579, 574, 577, 523, 156/527, 71, 94, 576; 7/105

[56] References Cited

U.S. PATENT DOCUMENTS

| | | | |
|---|---|---|---|
| 1,192,637 | 7/1916 | Huddleston | 156/577 |
| 1,743,474 | 1/1930 | Norfolk | 156/577 X |
| 3,325,336 | 6/1967 | Gibson | 156/577 |
| 4,072,547 | 2/1978 | Pavinca | 156/576 X |
| 4,409,772 | 10/1983 | Boyack | 156/71 X |
| 4,584,233 | 4/1986 | Meader, Jr. | 156/307.7 X |
| 4,750,968 | 6/1988 | Sweeny | 156/523 |
| 4,781,782 | 11/1988 | Luhman et al. | 156/361 |
| 4,913,766 | 4/1990 | Löjdström | 156/523 |
| 5,221,408 | 6/1993 | Haider | 156/579 |

*Primary Examiner*—David A. Simmons
*Assistant Examiner*—James J. Engel, Jr.
*Attorney, Agent, or Firm*—Rhodes & Ascolillo

[57] ABSTRACT

In a preferred embodiment, a tool for applying a piece of patching material to an area, the tool including: an elongate member having distal and proximal ends; securing apparatus to releasably secure the patching material to the distal end; releasing apparatus, operable from the proximal end, to release the patching material and to place the same on the area; and finishing apparatus disposed at the distal end to smooth and secure the patching material on the area after the patching material is placed thereon.

6 Claims, 3 Drawing Sheets

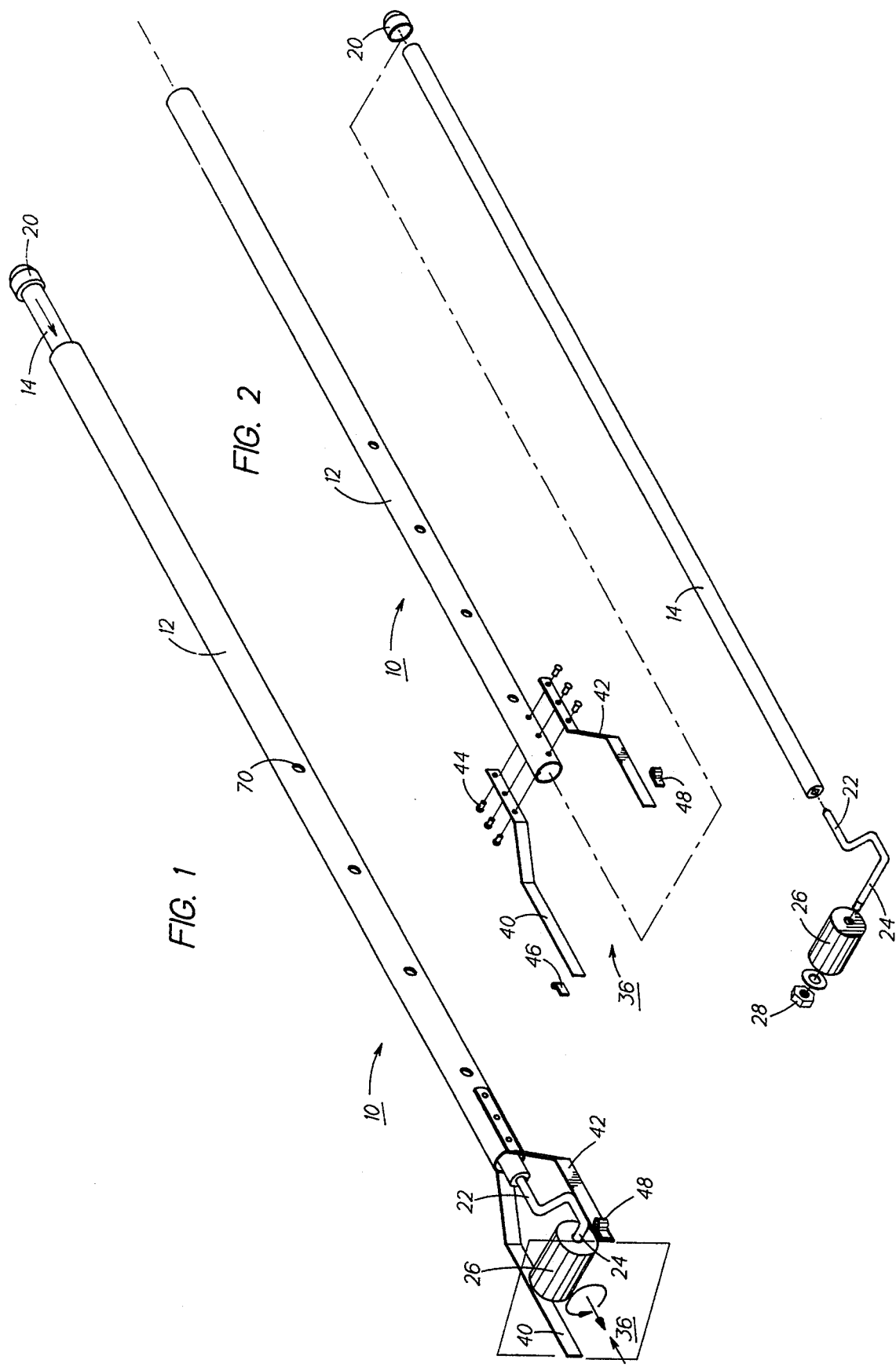

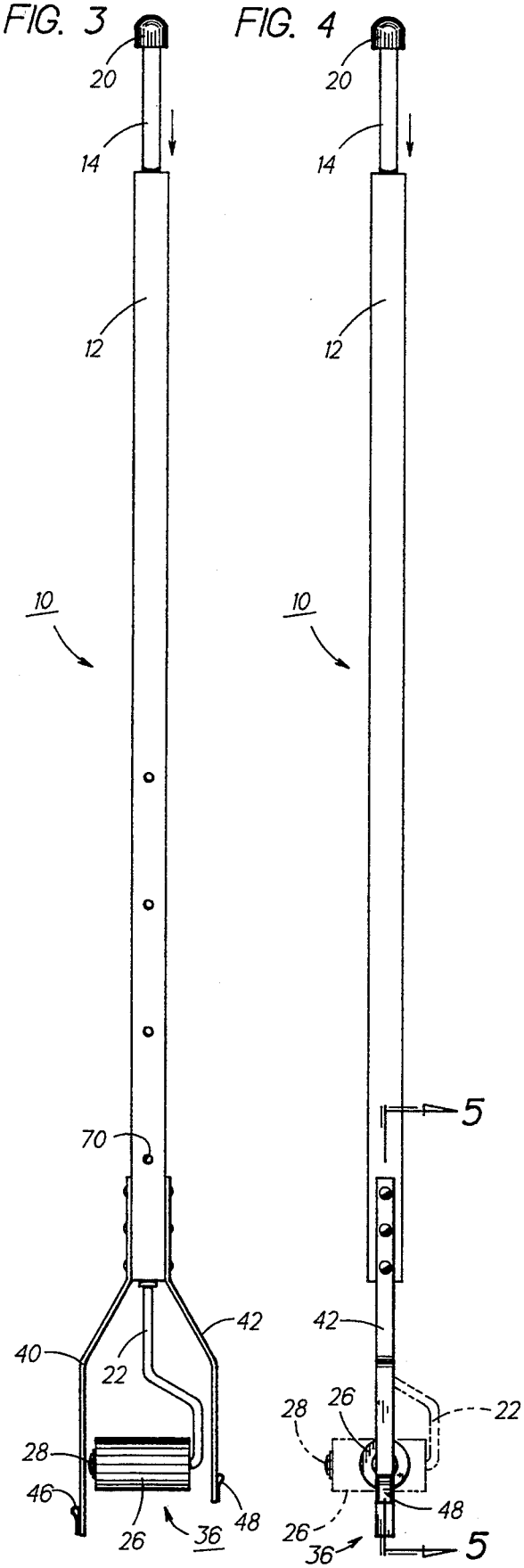
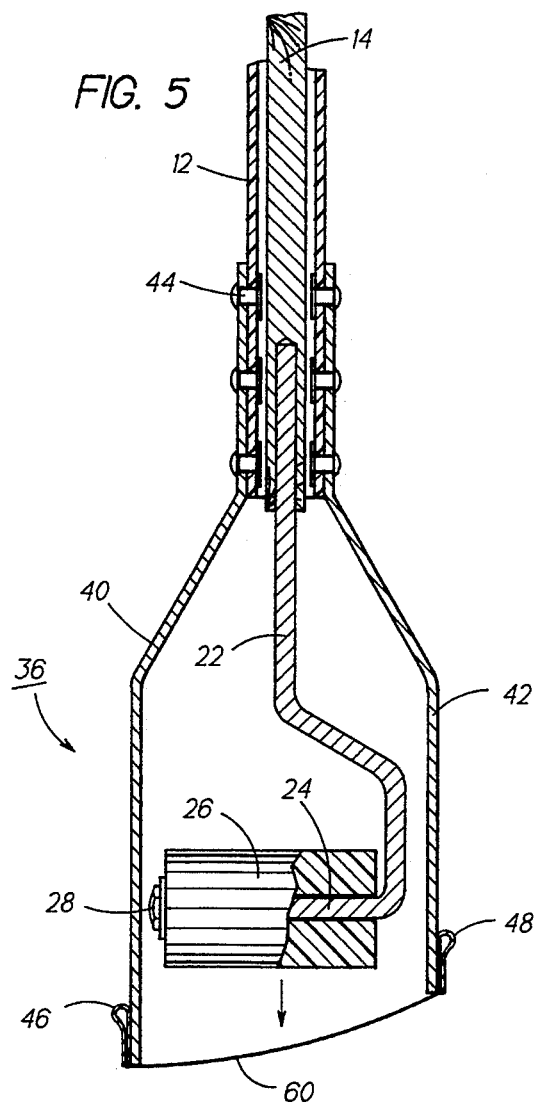

PATCHING TOOL AND METHOD

BACKGROUND OF THE INVENTION

1. Field of the Invention

The present invention relates to patching torn sheet materials generally and, more particularly, but not by way of limitation, to a novel tool and method for patching which are particularly useful in patching a liner in a pool of water.

2. Background Art

Many types of pools, and particularly swimming pools used in residential settings, include a flexible polymeric membrane liner lying against a wood or concrete form. This is a relatively economical type of construction compared to an all-concrete pool; however, the membrane liner is subject to ripping if sharp objects are pressed against or along it.

Repair kits for pool liners are available which include a sheet or roll of flexible patching material and a quantity of adhesive. To repair a rip in the liner, the patching material is cut to the proper size to cover the rip with a certain amount of overlap. The adhesive is applied to the patching material and then the patching material is manually applied over the rip and smoothed and secured in place. While the patch thus formed is satisfactory, applying it in a pool filled with water can be quite difficult, since two hands are required for the procedure and the natural buoyancy of the human body makes it impossible to stay at the bottom of the pool to apply the patch without taking relative elaborate, and perhaps dangerous, measures to weight down the body to counteract the buoyancy thereof. Additionally, the adhesive employed can be hazardous to the skin and eyes if contact is made.

Various devices have been developed to apply flexible materials, such as wall paper or tape to surfaces. Some of these are described in U.S. Pat. No. 1,192,637, issued Jul. 25, 1916, to Huddleston, U.S. Pat. No. 3,325,336, issued Jun. 13, 1967, to Gibson, U.S. Pat. No. 4,750,968, issued Jun. 14, 1988, to Sweeny, U.S. Pat. No. 4,781,782, issued Nov. 1, 1988, to Luhman et al., and U.S. Pat. No. 4,913,766, issued Apr. 3, 1990, to Lojdstrom. However, none of these devices are adapted to applying a short patch with an adhesive thereon as is required in repairing a pool liner.

Accordingly, it is a principal object of the present invention to provide a tool and a method for remotely applying a patch to a surface.

It is a further object of the invention to provide such a tool that is economical to construct and easy to use.

It is an additional object of the invention to provide such a tool and a method that can be employed for patching a pool liner.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a tool for applying a piece of patching material to an area, said tool comprising: an elongate member having distal and proximal ends; securing means to releasably secure said patching material to said distal end; releasing means, operable from said proximal end, to release said patching material and to place the same on said area; and finishing means disposed at said distal end to smooth and secure said patching material on said area after said patching material is placed thereon.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 1 is an isometric view of a tool according to the present invention.

FIG. 2 is an exploded isometric view of the tool.

FIG. 3 is a top plan view of the tool.

FIG. 4 is a side elevational view of the tool.

FIG. 5 is a top plan view, partially in cross-section, taken along line "5—5" of FIG. 4, with a roller in retracted position.

DETAILED DESCRIPTION OF THE PREFERRED EMBODIMENTS

Figure 6:
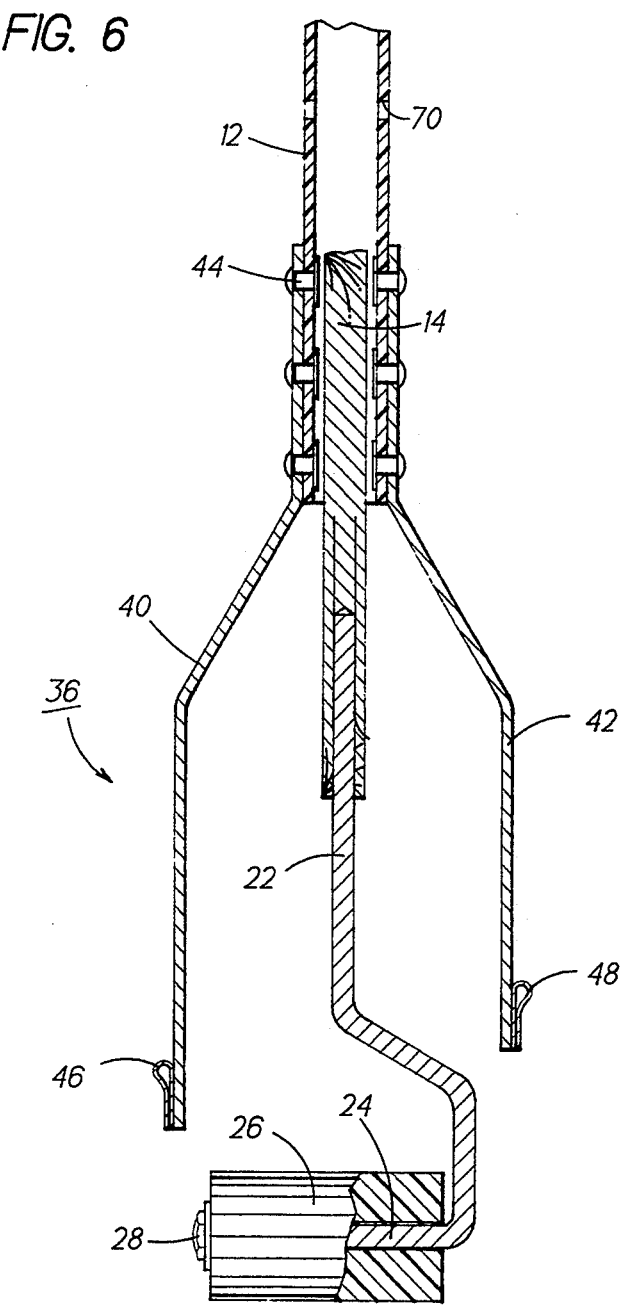
FIG. 6 is a top plan view of FIG. 5, with a roller in extended position.
Figure 7:
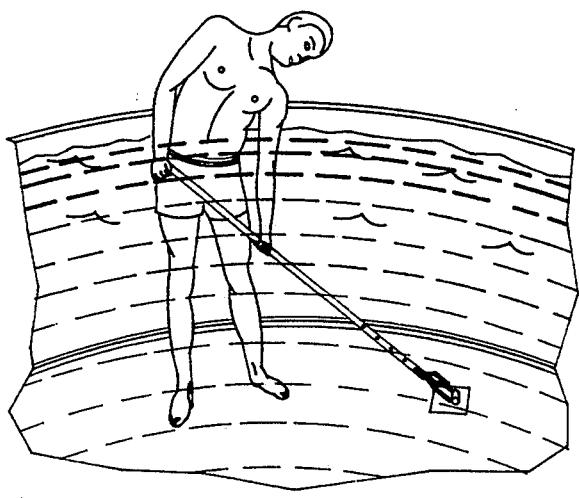
FIG. 7 is an environmental view showing the Patching Tool being used in a partial view of a swimming pool containing water.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

There is illustrated a tool for applying a patch, according to the present invention, the tool being generally indicated by the reference numeral 10. Tool 10 includes a hollow, elongate, cylindrical, outer tube 12 and an elongate, cylindrical inner tube 14. Inner tube 14 is disposed within outer tube 12 for axial and rotational movement therein and is somewhat longer than the outer tube (FIGS. 1-4), the inner tube extending from both ends of the latter.

Disposed on the proximal end of inner tube 14 is a knob 20 which functions as a handle to manually control movement of the inner tube within outer tube 12. A shaft 22 (FIG. 5) is fixedly attached to the distal end of inner tube 14 and extends axially outwardly therefrom. The distal end of shaft 22 terminates in a bent portion 24 which is orthogonal to the major axis of inner tube 14. Journalled on bent portion 24, for rotation thereon, is a roller 26 held in place by means of a threaded nut 28.

With reference primarily to FIGS. 2 and 5, an outwardly axially open U-shaped bracket 36 is formed at the distal end of outer tube 12 by arms 40 and 42, the arms being attached to the outer tube by means of rivets, as at 44. Spring clips 46 and 48 are fixedly attached to the outer surfaces of arms 40 and 42, respectively, to which clips (FIG. 5) may be removably attached a piece of patching material 60.

It will be understood from inspection of FIGS. 1, and 3-5 and the motion arrows thereon, that inner tube 14 is axially movable within outer tube 12 to the extent that roller 26 can be moved from the position shown on those figures, in which the roller is entirely within bracket 36, to a position in which the roller extends from the bracket as is shown on FIG. 6.

It will also be understood from inspection of FIGS. 1 and 4 and the motion arrow on the former that inner tube 14 is rotatable within outer tube 12 so as to rotate roller 26 from the position shown on FIG. 1 and in solid lines on FIG. 4, in which position the major axis of the roller lies in the plane of bracket 36, to the position shown in broken lines on FIG. 4, in which position the major axis of the roller is orthogonal to the plane of the bracket.

In use, piece of patching material 60 is fastened to the open end of bracket 36 by means of spring clips 46 and 48 and an adhesive (not shown) is placed on the outer surface of the patching material. Then, the distal end of tool 10 is moved to the area to be patched and the patch placed thereagainst. Now, roller 26 is rotated to the position shown in broken lines on FIG. 4. Then inner tube 14 is gently extended so that roller 26 engages patching material 60 and outer tube 12 is then retracted over inner tube 14 so that the roller extends from bracket 36 (FIG. 6). Now, tool 10 is moved back and forth so that roller 26 smoothes and secures patching material 60 in place. The tool is removed from the patching area and any adhesive on roller 26 is cleaned therefrom.

A plurality of holes, as at 70, is provided in the lower portion of outer tube 12 to permit water to quickly enter the tube to decrease the buoyancy of the tool 10 when the tool is inserted in a pool of water and to permit water to quickly drain from the tube when the tool is removed from the pool of water.

The components of tool 10 may be economically constructed of any suitable materials. Roller 26 is preferably formed from a polymeric material which will slightly grip patching material 60 to aid in the smoothing and securing thereof.

In the swimming pool context, the user can comfortably stand at the edge of the pool and follow the above procedure. Having arm 42 of bracket 36 (FIG. 5) somewhat shorter than arm 40 thereof is useful in the swimming pool context to compensate for the fact that the open end of the bracket will usually be at an angle to the bottom or wall of the pool being repaired.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A tool for applying a piece of patching material to an area, said tool comprising:
    (a) an elongate member comprising:
        a hollow outer tube having distal and proximal ends; an inner tube, having distal and proximal ends, disposed in said outer tube for axial and rotational movement within said outer tube; and
        said outer tube further comprising a plurality of ports, said plurality of ports allowing water into said outer tube when said tool is placed in water, and said ports allowing water out of said outer tube when said tool is brought out of water;
    (b) a securing means to releasably secure said patching material to said distal end comprising a bracket disposed at said distal end;
    said bracket comprising an outwardly open U-shaped member formed by two arms lying in a plane, said arms being attached to and extending from said distal end of said hollow outer tube, and said patching material can be releasably attached across said open U-shaped member;
    (c) releasing means, operable from said proximal end, to release said patching material and to place the same on said area, comprising said distal end of said inner tube, which distal end can be extended from said distal end of said outer tube so as to release said patching material from said bracket and to place said patching material on said area;
    (d) finishing means disposed at said distal end to smooth and secure said patching material on said area after said patching material is placed thereon; and
    (e) a roller disposed on a shaft extending from said distal end of said inner tube, said roller having a major axis disposed orthogonally to a major axis of said inner tube, said roller being extendable, by axial movement of said inner tube within said outer tube, from a first position within said U-shaped member to a second position spaced from said U-shaped member, said axial movement of said roller releasing said patching material from said bracket and placing said patching material on said area.

2. A tool, as defined in claim 1, wherein one of said arms is shorter than the other.

3. A tool, as defined in claim 1, wherein said inner tube is rotatable within said outer tube and said roller can thereby be rotated to a position in which its major axis is orthogonal to said plane of said bracket before said roller is moved from said first position to said second position.

4. A tool, as defined in claim 1, wherein said finishing means comprises said roller which may be rolled back and forth over said patching material after said patching material has been placed on said area.

5. A tool, as defined in claim 1, wherein said inner tube has a handle, fixedly disposed at the proximal end of said inner tube, which can be manually grasped to effectuate axial and rotational movement of said inner tube.

6. A method of applying a piece of patching material to an area, said method comprising:
    (a) providing an elongate member having distal and proximal ends;
    (b) releasably securing a patching material to said distal end;
    (c) operating releasing means, from said proximal end, to release said patching material and to place the same on said area;
    (d) applying said patching material to a rip in a pool liner in a pool of water;
    (e) using finishing means disposed at said distal end to smooth and secure said patching material on said area after said patching material is placed thereon; and
    (f) applying said patching material to a rip in a pool liner in a pool of water.

* * * * *